UNITED STATES PATENT OFFICE.

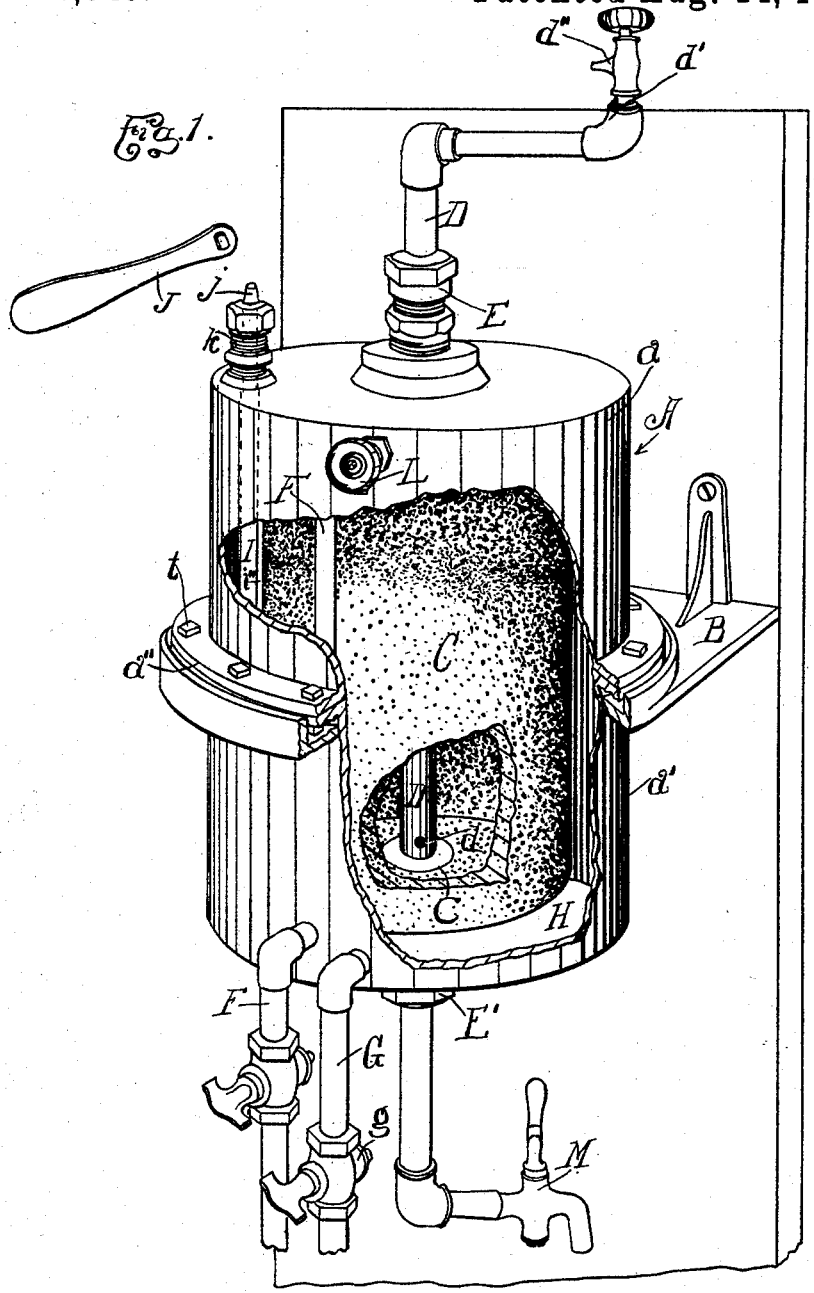

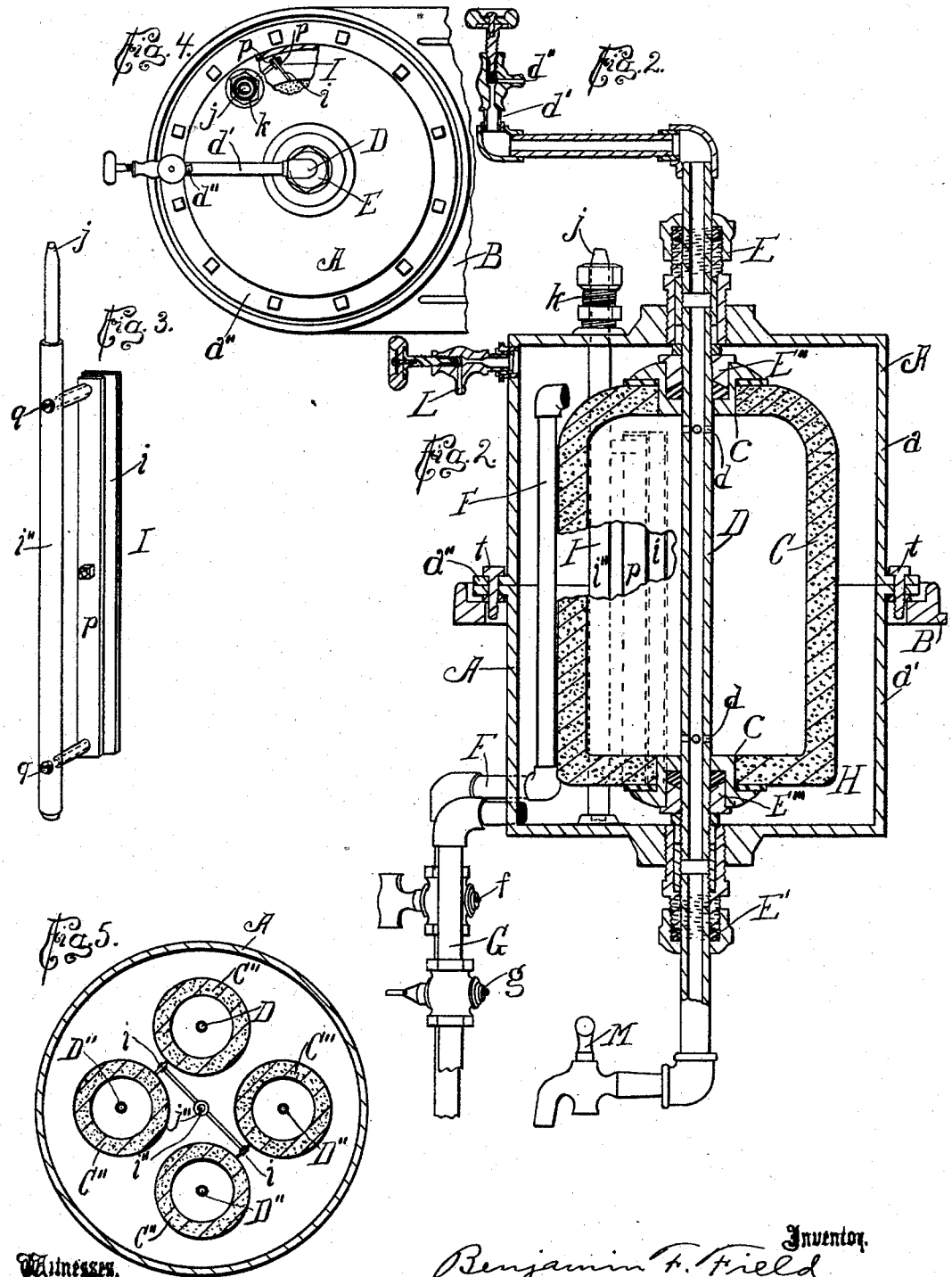

BENJAMIN F. FIELD, OF LOS ANGELES, CALIFORNIA.

WATER-FILTER.

SPECIFICATION forming part of Letters Patent No. 524,545, dated August 14, 1894.

Application filed March 6, 1893. Serial No. 464,688. (No model.)

*To all whom it may concern:*

Be it known that I, BENJAMIN F. FIELD, a citizen of the United States, residing at Los Angeles, in the county of Los Angeles and State of California, have invented a new and useful Water-Filter, of which the following is a specification.

The object of my invention is to produce a filter which can be supplied directly from the water pipes of a pressure system and which will supply a continuous flow of water when desired.

A further object of my invention is to provide means for conveniently and thoroughly cleansing the filter from time to time as may be required.

My improved filter comprises the combination of an outer receptacle connected with the service pipe; an inner filter drum composed of unglazed earthen ware or other filtering material of like suitable character mounted upon a tubular axle journaled to revolve within the outer receptacle; such tubular axle opening from the inner filter drum, and arranged to extend through the end of the outer receptacle and provided with a suitable valve or faucet to allow the water to be drawn from within the inner filter drum or reservoir.

It also comprises the combination with parts just enumerated of a scraper or washer attachment arranged at one side of the filter drum or inner reservoir and adapted to engage the periphery of such drum (so that when the filter drum is rotated, the scraper or washer operates to remove the sediment or accumulations which may be deposited upon the periphery of the filter drum), and suitable means for withdrawing the impure water from within the outer chamber formed between the outer receptacle and the inner filter drum.

My improved filter is also provided with suitable valved vents or spigot openings arranged to allow the escape of air from the inner and outer reservoirs when water is being allowed to run into such reservoirs, and to admit air when water is being drawn off.

The accompanying drawings illustrate my invention.

Figure 1 is a perspective view of my improved filter with parts broken away to expose the inner construction. Fig. 2 is a vertical midsection of my improved filter the several parts being so disposed as to allow them to be cut by the line of section. This section is not a section of the filter shown as arranged in Fig. 1, but the positions of the spigots and other parts are changed as required for best illustration of parts because the positions of such parts are not arbitrary and can be changed to suit the convenience and this view is shown with the parts arranged for most convenient illustration while Fig. 1 shows the parts arranged for most convenient use. Fig. 3 is a detail of the washer removed. Fig. 4 is a plan view of the filter in position for use. A portion is broken away to expose the scraper or washer. Fig. 5 is a section plan showing a modification of my invention in which four inner reservoirs are employed to increase the capacity and in which the scrapers are arranged to cleanse the four reservoirs.

A is the outer receptacle formed of upper and lower sections $a$ $a'$ which are secured together by bolts and packing at $a''$. This receptacle may be supported by means of a bracket B or by other suitable means.

C is the interior filter drum or reservoir of unglazed earthen-ware and in actual practice, as manufactured by me, has a capacity of one gallon but may be made of any size desired, the dimensions not being of the essence of my invention. This interior filter reservoir or drum is integral throughout and is provided with end openings $c$ $c$ axially arranged to allow the tubular axle D to extend therethrough.

Suitable packing boxes E E' E'' and E''' are arranged at the ends of the filter drum and receptacle to allow rotation of the axle and to prevent leakage between the outer receptacle and the axle and between the filter drum and the axle.

$d$ $d$ are perforations in the tubular axle communicating between the interior of the filter drum and the interior of the tube D. The upper portion of the axle D is bent to form a suitable crank $d'$ and a vent valve $d''$ is provided to allow the admission of air into the tube D to supply the vacuum caused by drawing water from the filter and also to allow the escape of air when the filter is being filled. The interior perforations $d$ are arranged both at the top and bottom of the pipe D so that there is within the filter drum complete connection with all parts of the drum through the spigot $d''$ (and water can freely flow into and out of the drum).

F is the service pipe which is connected with the system of water under pressure.

G is a valve controlled discharge pipe arranged to open from the bottom of the outer chamber H and is designed to be connected with the waste pipes of the house where used so that when the valve $g$ is opened the water will be discharged from the chamber H and allowed to flow away.

I is the scraper or washer device which consists of a rubber or scraper $i$ secured to a suitable shaft $i''$ which is mounted at top and bottom of the outer receptacle A and is provided with a stem $j$ upon which a handle J can be applied to partially rotate the shaft to bring the scraper $i$ against the periphery of the drum C, or to remove the scraper from contact with such drum.

As shown in the drawings the rubber or scraper is formed of rubber or other suitable material and is clasped between two iron bars $p\ p$ which are connected by bolts $q\ q$ with the shaft $i''$ of the washer device which shaft is provided with the stem $j$ which projects up above the top of the outer receptacle and is provided with a suitable packing box $k$ to prevent leakage.

L is a valved vent communicating with the chamber H to allow of the ingress or egress of air.

In operation the water is turned into the outer chamber H through the service pipe F and the chamber is allowed to fill. The water percolates through the inner drum C until the same is filled and the pressure is thus equalized; and, provided the vents are closed, no more water will run into the filter until the faucet M or the valve $g$ is opened to allow the escape of water. When the faucet M is opened, the water flows out through the perforations $d$, the pipe D, and the faucet M. The vents $d$ and L are opened and closed as may be found desirable to freely admit and discharge the water. To cleanse the periphery of the filter drum from any impurities which may accumulate thereupon, the stem $j$ is partially turned by the handle J which is applied thereto for that purpose, and the scraper $i$ is brought into contact with the periphery of the filter drum. The handle $d'$ is then rotated thus turning the drum and causing it to be turned around and scraped by the scraper, thereby removing the accumulations from the periphery. In practice this may be done every day or every other day or at such intervals as may be desirable; depending upon the condition of the water. After the filter drum has thus been cleansed, the waste valve $g$ is opened and the foul water is drawn off and the chamber H is thoroughly rinsed by admitting water through the service pipe F. The service pipe F, as shown, ends above the top of the filter drum within the outer chamber H so that when the washer has been employed to scrape the sediment from off the periphery of the drum the drum may be thoroughly rinsed and cleaned by first cutting off the water from the pipe F then opening the valve $g$ and allowing the water to flow out of the chamber H, then opening the valve $f$ of the service pipe and allowing the water to dash in under full pressure to strike upon the top of the filter drum and thence to flow down over the inside of such drum to rinse it. At the same time the filter drum should be rotated so that the stream will strike all parts thereof.

The modification shown in Fig. 5 comprises four inner filter reservoirs or drums and two scrapers arranged between such drums and connected with the central stem $j''$ which is adapted for the partial rotation of the scrapers so as to bring them against their several inner filter reservoirs or drums to scrape them when the same are rotated. The construction and arrangement of the drums $C''$ and their tubular axles $D''$ are the same as those of the drum C and axle D. The packing boxes E and E' are arranged respectively with right and left hand screw-threads so that in rotating the drum, the packing boxes will not be unscrewed.

The inside of the outer reservoir may be of granite ware or otherwise glazed or galvanized or plated iron to avoid corrosion, or it may be painted with suitable waterproof coating. Access to the interior of such drum may be had by removing bolts $t$ and unscrewing the packing E.

Now, having described my invention, what I claim as new, and desire to secure by Letters Patent, is—

1. In a filter, the combination with an outer receptacle adapted for connection with a service or supply pipe, of an inner hollow filtering drum rotatable on a substantially vertical axis forming a storage reservoir for filtered water and having a valved hollow journal at the upper end extending through the casing for the admission of air within the drum, a hollow journal at the lower end for the discharge of the contents of the drum and a scraper for cleaning said drum; substantially as described.

2. In a filter, the combination with an outer receptacle adapted for connection with a service or supply pipe, of an inner hollow vertically arranged rotary filtering drum forming a storage reservoir for filtered water, a vertical tubular shaft on which said drum is mounted working in bearings in the top and bottom of the receptacle and perforated within the drum, the valved crank extension on the upper end of the tubular shaft for the admission of air within the drum, and the discharge pipe on the lower end of the tubular shaft, and a scraper or cleaner for cooperation with the wall of the drum; substantially as described.

3. In a filter, the combination with the receptacle and a series of rotary filtering drums journaled within the same on parallel axes, of a scraper or cleaner mounted to turn in a center parallel with the axes of the drums and adapted to be turned to cooperate with different drums; substantially as described.

B. F. FIELD.

Witnesses:
JAMES R. TOWNSEND,
F. M. TOWNSEND.